(12) United States Patent
Mays et al.

(10) Patent No.: US 6,196,439 B1
(45) Date of Patent: Mar. 6, 2001

(54) METHOD AND APPARATUS FOR μBGA REMOVAL AND REATTACH (75) Inventors: Allen Thomas Mays; Kris Allan Slesinger, both of Charlotte; Michael Camillo Weller, Harrisburg, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/087,602

(22) Filed: May 29, 1998

(51) Int. Cl.$^7$ .................................................. B23K 1/00
(52) U.S. Cl. ............................................. 228/6.2; 201/264
(58) Field of Search ................................ 228/105, 180.22, 228/212, 213, 218, 221, 264, 19, 20.1, 20.5, 21, 44.7, 6.2

(56) References Cited

U.S. PATENT DOCUMENTS

| | | | |
|---|---|---|---|
| 3,680,198 | * 8/1972 | Wood ....................................... | 29/498 |
| 4,518,110 | * 5/1985 | Breske et al. ............................ | 228/20 |
| 4,752,025 | * 6/1988 | Stach et al. ............................... | 228/9 |
| 4,965,433 | * 10/1990 | Hanke et al. ........................... | 219/230 |
| 4,972,990 | 11/1990 | Abbagnaro et al. . | |
| 4,980,971 | * 1/1991 | Bartschat et al. ....................... | 29/833 |
| 5,065,933 | * 11/1991 | Basavanhally ....................... | 228/102 |
| 5,278,393 | 1/1994 | Kim . | |
| 5,392,980 | 2/1995 | Swamy et al. . | |
| 5,516,030 | 5/1996 | Denton . | |
| 5,542,601 | 8/1996 | Fallon et al. . | |
| 5,560,531 | 10/1996 | Ruszowski . | |
| 5,598,965 | 2/1997 | Scheu . | |
| 5,601,229 | * 2/1997 | Nakazato et al. .................... | 288/246 |
| 5,639,011 | 6/1997 | Jacks et al. . | |
| 5,642,261 | 6/1997 | Bond et al. . | |
| 5,754,677 | * 5/1998 | Kawada ............................... | 382/141 |
| 5,839,187 | * 11/1998 | Sato et al. ............................ | 29/743 |
| 5,847,366 | * 12/1998 | Grunfeld ............................. | 219/497 |
| 5,867,260 | * 2/1999 | Sakai ................................... | 356/237 |
| 5,885,848 | * 3/1999 | Kirkland et al. ..................... | 438/106 |
| 5,944,093 | * 8/1999 | Viswanath ....................... | 165/104.26 |
| 5,983,477 | * 11/1999 | Jacks et al. ......................... | 29/407.1 |
| 6,016,949 | * 1/2000 | Slesinger ........................ | 228/180.22 |
| 6,019,166 | * 2/2000 | Viswanath et al. ................. | 165/80.4 |
| 6,069,483 | * 5/2000 | Maxwell et al. ..................... | 324/760 |

\* cited by examiner

Primary Examiner—Patrick Ryan
Assistant Examiner—Kiley Stoner
(74) Attorney, Agent, or Firm—Pollock, Vande Sande & Amernick; Lawrence R. Fraley (57) ABSTRACT

An apparatus for attaching an electronic device to and removing an electronic device from a substrate. An electronic device pick-up and vacuum head applies a vacuum source to the electronic device for engaging, picking up and retaining the electronic device. The heat is transmitted by conduction through the structure of the device pick-up and vacuum head to the electronic device and solder for securing the electronic device on the substrate to heat the solder to its reflow temperature. The pick-up and vacuum head includes an electronic device engaging portion, a vacuum port, and a heat source engaging portion.

21 Claims, 6 Drawing Sheets

METHOD AND APPARATUS FOR µBGA REMOVAL AND REATTACH

FIELD OF THE INVENTION

The invention relates to a method and apparatus for removing and attaching devices to a substrate utilizing a ball grid array wherein the device and the ball grid array are heated through conduction of heat through the apparatus.

BACKGROUND OF THE INVENTION

Ball grid arrays (BGAS) are utilized for connecting electronic components, such as integrated circuit chips, to circuit boards. Typically, the electronic components in the circuit boards each include a plurality of contacts. Typically, contacts on the circuit board will be arranged in patterns on different areas of the circuit board to match the pattern of contacts on electronic devices, such as chips and chip carriers, that are to be attached on specific locations on the circuit board.

BGAs typically include at least one ball of solder arranged between the electronic component and the circuit board at each contact so as to electrically connect the electronic component to the circuit board. BGAs replace perimeter pins with solder balls to directly attach the electronic component to the circuit board. Thus, BGAs permit a reduction in the number of leads in a given package size, increase I/O density for a given package size, among other advantages.

Additionally, the BGAs can be self-aligning during reflow. This is at least partially a result of surface tension of the solder. The surface tension of the solder pulls the solder into the smallest possible shape.

Additional information regarding BGAs and BGA packages is provided by "IBM Details Its Ball-Grid Array Push," Electronic Engineering Times, Aug. 9, 1993, and "Ball Grid Arrays: The Hot New Package," Electronic Engineering Times, Mar. 15, 1993. The entire contents of these two articles is hereby incorporated by reference.

To attach the electronic components to circuit boards, the solder balls are first attached to the side of the electronic component to be attached to the circuit board. Typically, attaching solder balls to an electronic component is accomplished by placing the solder balls in contact with the electronic component and raising the temperature of the solder balls above the melting point. The solder balls are then cooled.

The electronic component and BGA typically are attached to the circuit board by placing the electronic component and BGA in contact with desired location on the circuit board. The temperature of the solder is then caused to rise above the reflow temperature of the solder. As the solder cools, it secures the component to the circuit board or other substrate.

Typically, heating the solder to attach the component to the circuit board is carried out by exposing the electronic component and, hence, the attached solder balls to heated gas. This operation typically is performed in a convection reflow furnace. The electronic component and attached solder balls are heated through convection of heat from the gas to the electronic component to the solder balls. These solder balls may also be heated directly by contact with the hot gas.

During the process of attaching electronic components to circuits boards, all of the connections might not be successfully made between the electronic component and t he circuit board by the solder balls. Such instances may be detected by testing the component prior to advancing the circuit board to further processes or incorporation into other devices. Additionally, during the operation of a device including the circuit board, some of the connections may fail.

Figure 1:
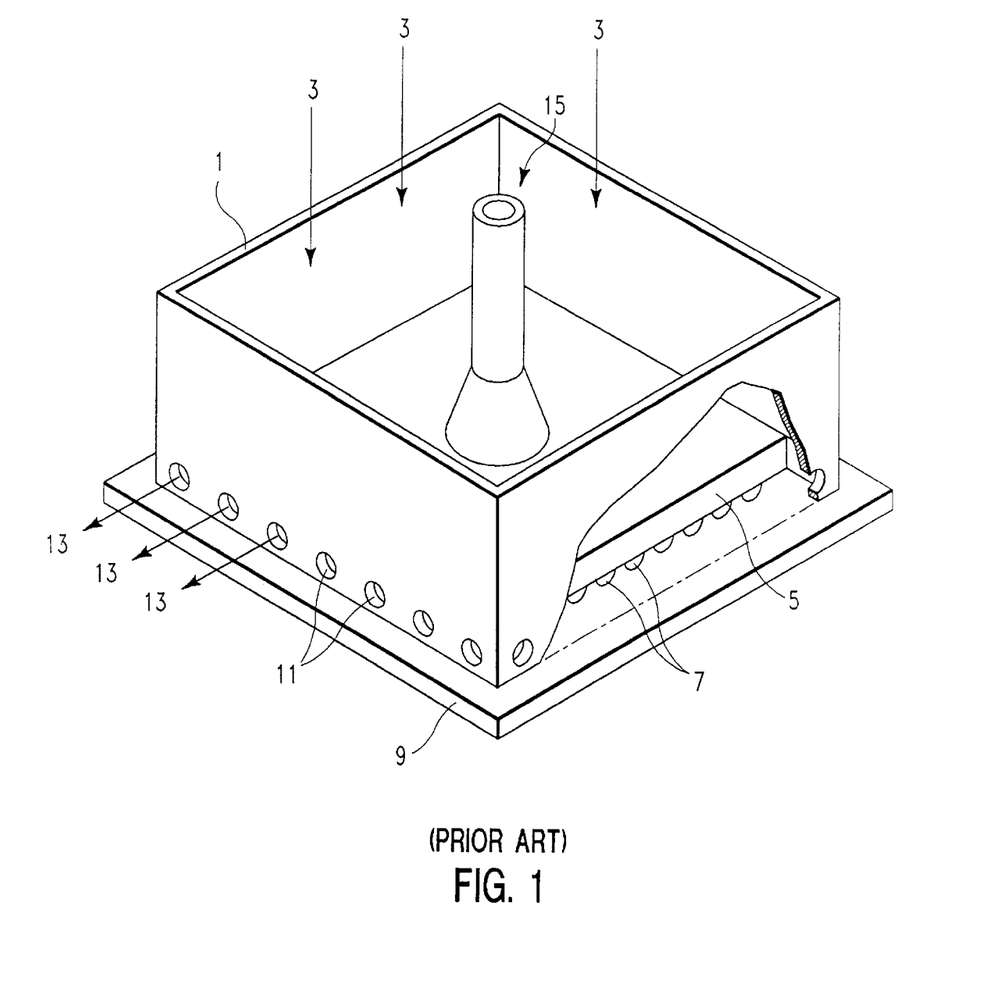
FIG. 1 represents a perspective partial cut-away view of an example of a prior art apparatus for introducing heat to an electronic device and solder balls for attaching the electronic device to and/or removing the electronic device from a substrate.

Whether failures of connections occur prior to or during operation of a circuit board that includes the BGA, the electronic component may need to be reheated to remove it from the circuit board. Hot air devices such as shown in FIG. 1 are also typically used for this "rework" process as well. FIG. 1 illustrates one example of a known device utilized for heating electronic components and attached solder balls to attach the component to a circuit board. An additional reason for removing an electronic component from a circuit board is to replace it with a new component in the event of improvements to the component. Such removed components may be repaired or replaced.

A micro ball grid array ($\mu$BGA) is a subset of the generic ball grid array. Typically, a $\mu$BGA is characterized by having a ball-to-ball spacing of about 30 mils or 0.03 inch or less. Typical BGA packages have a pitch of about 50 mils. Commonly, $\mu$BGA is in a chip scale packaging family which is defined as package size being no larger than 1.2 time the die size. Because of their small footprint, $\mu$BGA devices are designed to be placed in close proximity on a circuit board.

SUMMARY OF THE INVENTION

An object of the present invention is to provide a method and apparatus for attaching and removing electronic components from a circuit board through conduction of heat to the component and solder balls.

The present invention makes possible improving temperature control of the component and solder balls for attaching electronic components to a circuit board.

Furthermore, the present invention makes it possible to reduce transmittal of heat to devices attached to a circuit board adjacent to an electronic device being attached to a circuit board.

The present invention also helps to ensure adequate and uniform heating of components and solder balls for attaching electronic components to substrates such as circuit boards.

According to the present invention, the spacing of electronic components attached to a circuit board can be reduced.

Moreover, the present invention makes possible an apparatus that due to its size and operation does not require additional spacing between electronic components attached to a circuit board.

Also, the apparatus of the present invention does not require a nozzle for introducing hot gas to introduce heat through convection to an electronic component and solder balls on the component to be attached to a circuit board.

In accordance with these and other objects and advantages, the present invention provides an apparatus for attaching an electronic device or component to and removing an electronic device from a substrate. The apparatus includes an electronic device pick-up and vacuum head for applying a vacuum source to the electronic device for engaging, picking-up, and retaining the electronic device. Heat is transmitted by conduction through the structure of the device pick-up and vacuum head to the electronic device and solder for securing the electronic device on the substrate to heat the solder to its reflow temperature. The pick-up and vacuum head of the apparatus includes an electronic device engaging portion, a vacuum port, and a heat source engaging portion.

Aspects of the present invention also provide a system for attaching an electronic device to and removing an electronic device from a substrate. The system includes an apparatus for attaching an electronic device to and removing an electronic device from a substrate. The apparatus includes an electronic device pick-up and vacuum head for applying a vacuum source to the electronic device for engaging, picking-up, and retaining the electronic device. Heat is transmitted by conduction through the structure of the device pick-up and vacuum head to the electronic device and solder for securing the electronic device on the substrate to heat the solder to its reflow temperature. The pick-up and vacuum head includes an electronic device engaging portion, a vacuum port, and a heat source engaging portion. The system also includes a vacuum source connected to the vacuum port and a heat source connected to the heat source engaging portion.

Additional aspects provide a method for attaching an electronic device to and removing an electronic device from a substrate. The method includes contacting an electronic device with an apparatus for conductively applying heat to the electronic device and picking up the electronic device. Solder for attaching the electronic device to the substrate is heated to the reflow temperature of the solder by applying heat to the device for conductively applying heat.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

BRIEF DESCRIPTION OF THE DRAWINGS

The above-mentioned objects and advantages of the present invention will be more clearly understood when considered in conjunction with the accompanying drawings, in which:

FIG. 5 represents a perspective view of an embodiment of an apparatus according to the present invention and a component feed tray, wherein the device according to the present invention is engaging a substrate to be removed from the feed tray and attached to a substrate;

FIG. 6 represents an embodiment of an apparatus for verifying alignment of an electronic component on an embodiment of a device according to the present invention;

FIG. 7 represents a perspective view of an embodiment of a device according to the present invention arranged over a portion of a substrate that an electronic device is to be attached to;

DETAILED DESCRIPTION OF THE INVENTION

As discussed above, currently, electronic components are typically attached utilizing BGAs by heating the component and the solder balls of the BGA utilizing heat convection from hot gas. FIG. 1 illustrates an example of a known device for applying hot gas to an electronic component and the BGA. The device shown in FIG. 1 includes a nozzle 1 for directing hot gas, the flow of which is indicated by arrows 3 toward the component 5 to be attached utilizing solder balls 7 to a circuit board 9. Gas flows down the nozzle over the component 5 and exits the device through exhaust ports 11. The flow of exhaust gas is indicated by arrows 13. The device shown in FIG. 1 includes a vacuum pick-up tube 15 for applying a source of vacuum to the top surface of the component 5. The vacuum permits the device to engage the component 5 permitting the device to pick-up the component and move it.

Devices such as those illustrated in FIG. 1 suffer from a number of inherent problems. For example, as shown in FIG. 1, the edges of the device extend around the electronic component 5 being attached to the substrate 9. Therefore, sufficient space must exist around the component to accommodate the attachment device. The space requirement, of course, requires that devices on the substrate be spaced apart to accommodate the pick-up and heating device.

Another shortcoming of the device illustrated in FIG. 1 is that exhaust gas 13 exits exhaust ports 11. This exhaust gas, which is still hot, flows toward other electronic devices attached to the substrate in the vicinity. Naturally, this introduces heat to the additional devices on the substrate. The heat applied to adjacent devices during the attachment or removal of a device from a substrate may cause the solder balls attached to adjacent devices to be heated to the reflow temperature of the solder. The solder may then flow and disrupt connections between the devices and the substrate or shifted out of proper location.

As the size of devices being attached to circuits boards shrinks, the size of the devices for removing and attaching the electronic devices typically shrinks as well. Shrinkage of the attachment devices introduces some problems. For example, since the device illustrated in FIG. 1 includes both a vacuum pick-up tube and a hot gas nozzle, there are limits to how small the nozzle/vacuum pick-up tube can be produced and still operate reliably.

Along these lines, if the vacuum pick-up tube is shrunk too much it may be impossible to deliver adequate vacuum pressure to confidently retain the electronic component on the pick-up tube. Shrinking of the gas nozzle may also reduce the amount of hot gas that can be applied toward the electronic component.

An additional short coming of devices such as that shown in FIG. 1 relates to the somewhat unpredictable nature of the introduction of heat through convection from the hot gas to the electronic component. Typically, such devices monitor the temperature of the hot gas, not the component being heated. Hence, determining the proper heating parameters typically requires separate use of temperature versus time sensors, which are often bonded to a test sample. Bonding of the temperature sensors typically renders the test samples non-functional. Multiple iterations of processes utilizing the removal and reattach device shown in FIG. 1 are often required to "dial in" the proper hot gas temperature, flow rate, and dwell times.

All of the above problems are magnified when utilizing a micro ball grid array ($\mu$BGA). As discussed above, $\mu$BGA is a further development of ball grid array technology. Typically, $\mu$BGA is characterized by having a ball-to-ball spacing of about 0.03 inch or less.

Commonly, $\mu$BGA is in a chip scale packaging family which is defined as package size being no larger than 1.2 time the die size. $\mu$BGAs typically have a significantly lower thermal mass than conventional BGA packages having a pitch of about 50 mils. Another characteristic of $\mu$BGAs is they have a weight per input/output of about 1/10 that of a plastic ball grid array (PBGA), the lightest substrate typical of conventional BGAs.

Because of their small footprint, $\mu$BGA devices are designed to be placed in close proximity on a circuit board. For example, $\mu$BGAs are typically placed on a substrate such as a circuit card with less than about 0.200 inch between packages.

The small size and mass of $\mu$BGA devices and their close spacing experience all of the above-discussed problems. For example, due to the close spacing, it is very difficult to create a hot air removal and reattach device. Also, due to their close spacing, the $\mu$BGA packages are specially susceptible to hot gas exhaust.

The present invention provides a solution to the above-described problems as well as others by providing a device that introduces heat to BGA packages through conduction of heat through the removal and reattach apparatus structure rather that through convection of heat through gas introduced into the removal and reattach device. The present invention is particularly useful for $\mu$BGA applications since it addresses the above discussed problems with $\mu$BGAs.

Figure 2:
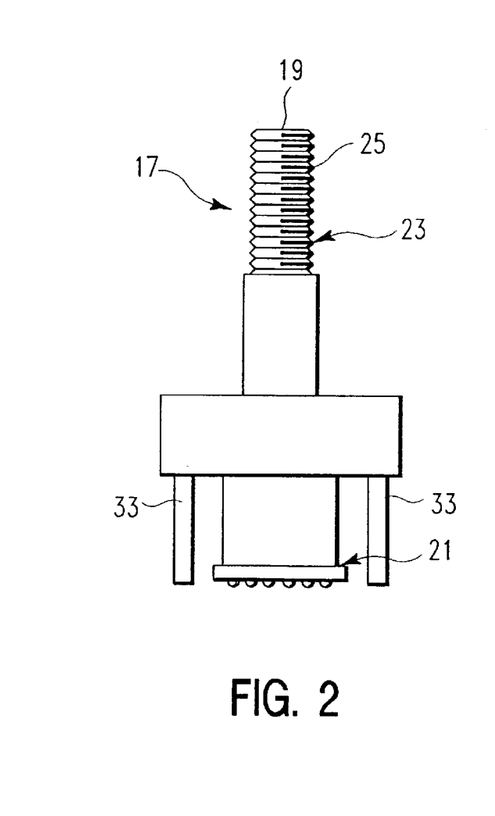
FIG. 2 represents a side view of an embodiment of an apparatus for removing and reattaching electronic devices to a substrate according to the present invention.

FIG. 2 illustrates an embodiment of an apparatus for attaching an electronic device to and/or removing an electronic device from a substrate. As referred to herein, an "electronic device" may refer to a chip whether alone or attached to a chip support or any other electronic device. The term "substrate" may refer to a circuit board, circuit card or other substrate.

An apparatus according to the present invention typically includes a pick-up and vacuum head for applying a vacuum source to the electronic device so as to engage the electronic device. By engaging the electronic device, the pick-up and vacuum head may pick-up the electronic device and retain it thereon for moving the electronic device from one location to another. Heat is transmitted by conduction through the structure of the pick-up and vacuum head to the electronic device. The heat is then conducted through the electronic device to solder balls to heat the solder balls for securing the electronic device to the substrate.

Typically, the solder balls are heated to a temperature above the reflow temperature of the solder. The pick-up and vacuum head includes an electronic device engaging portion, a portion for applying a vacuum to the pick-up and vacuum head and a heat source or heat source engaging portion for introducing heat to the pick-up and vacuum head.

The embodiment illustrated in FIG. 2 includes a vacuum port 19. The embodiment illustrated in FIG. 2 also includes an electronic device engaging portion 21 and a heat source engaging portion 23.

The exact shape of the device according to the present invention may vary. There is no requirement that it be shaped as the embodiment illustrated in FIG. 2. The apparatus may be shaped such that it includes a device engaging portion having a portion that contacts the electronic device having an outer shape approximately a similar shape to the shape of the electronic device. This may help to ensure that the electronic device is heated completely and evenly. Typically, this lower device engaging portion does not extend beyond the limits of the electronic device.

The remaining portion of a device according to the present invention may have various configurations as long as heat may be applied conductively through the device and a source of vacuum may be applied through the device to pick-up and move the electronic component being attached to the substrate.

The embodiment illustrated in FIG. 2 includes a threaded connection 25 for attaching a heat source and/or a vacuum source. The heat and/or vacuum source may be threadably attached to the device pick-up and vacuum head 17. The heat and vacuum may be introduced into the device pick-up and vacuum head through a single element. Alternatively, two separate devices could be connected to the device pick-up and vacuum head for separately applying vacuum and heat.

Both the vacuum and heat sources could be connected to the threaded connection 25. According to some embodiments, one of the heat source and vacuum source may be attached to the threaded connection. The other of the heat source and vacuum source may be connected by other means to pick-up and vacuum head. For example, a vacuum source could be inserted within the vacuum port 19.

Figure 3:
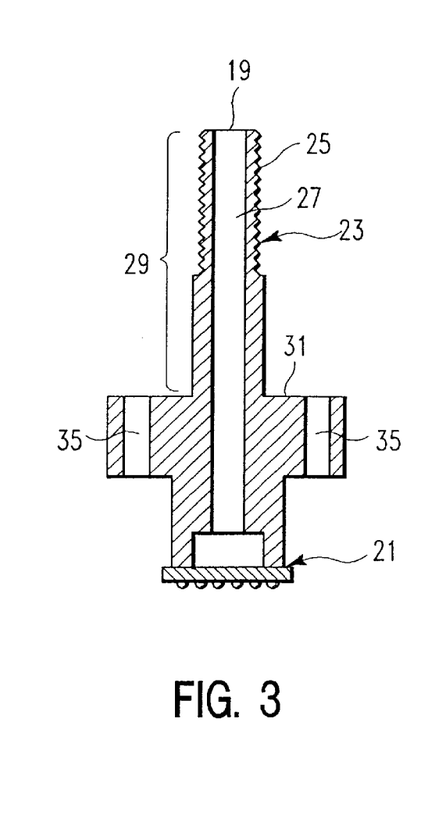
FIG. 3 represents a cross-sectional view of the embodiment illustrated in FIG. 2.

The vacuum port connected to an internal passage 27 shown in FIG. 3 could have interior threads. The vacuum source could have exterior threads complementary to interior threads in the vacuum port. Alternatively, the heat source and/or the vacuum source could be frictionally secured within the passage. However, rather than being connected to the pick-up and vacuum head, the heat source may be integral with the pick-up and vacuum head.

According to one embodiment, the heat source is a resistive heating element. However, any heat source may be utilized that can conductively introduce heat into the apparatus, electronic component, and solder balls.

As can be seen in FIG. 2 and cross section in FIG. 3, vacuum port 19 provides an opening to a central passage 27 through an upper elongated portion 29 of the pick-up and vacuum head. The exact configuration of the upper elongated portion 29 is not crucial to the present invention. The upper portion 29 could have other shapes, lengths, and cross sections without departing from the basic idea of providing an apparatus for conductively transmitting heat to the electronic component to be attached to the substrate and applying the vacuum source to the component through the device.

Figure 4:
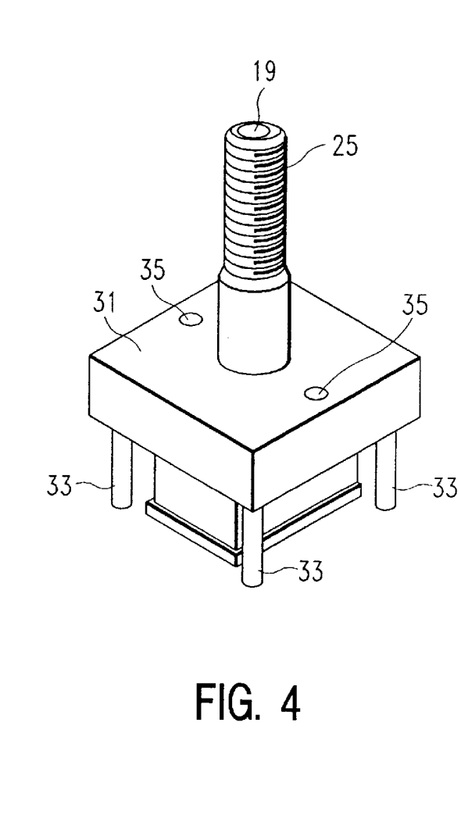
FIG. 4 represents a perspective view of the embodiments shown in FIGS. 2 and 3.

Additionally, although the embodiment illustrated in FIGS. 2–4 is a single member, a device according to the present invention could include more than one member joined together. For example, the upper tubular portion could be connected to a lower device engaging portion through threads, frictional connections, welding, adhesives, or any other means.

The upper tubular portion 29 integral with or joined to a central flared portion 31. The flared portion 31 may provide the apparatus of the present invention with a heat sink to help the device retain heat and provide more uniform and reliable heat to the process for removing and attaching components to a substrate. As illustrated in FIG. 2 and in a perspective view in FIG. 4, the central portion 31 may be a flared out portion having a rectangular cross section. Of course, it could have any shape. To result in more uniform conductance of heat to the electronic component being attached to the substrate, the flared portion 31 may be flared with respect to the device engaging portion of substantially equal lengths around the entire perimeter of the central portion 31.

Central portion 31 may also include a plurality of standoffs 33. The standoffs may engage a surface of the substrate that an electronic component is being attached to. As a result, when the pick-up and vacuum head with the attached component is arranged over the site where the component is to be attached and the pick-up and vacuum head and electronic component are placed in contact with the surface of the substrate, the standoff will engage the surface of the substrate and help prevent the device of the present invention from applying force to the electronic component. Such force could cause the solder of the solder balls when heated to the reflow temperature to simply spread out in the space between the electronic component and the surface of the substrate. If the solder flows in this space solder balls could be interconnected with each other resulting in shorts and/or a failure of the connections.

At least one standoff may also control space between electronic devices attached to the substrate. The embodiment shown in FIGS. 2–5 includes four standoff posts arranged in a square attached to the pick-up and vacuum head. However, the present invention may include as many standoff posts as is necessary. According to one embodiment, rather than posts, may include standoff walls. For example, the pick-up and vacuum head could include two standoff walls arranged on opposite sides of the pick-up and vacuum head. The wall could also extend all the way around the pick-up and vacuum head.

The central portion 31 of the apparatus may also include one or more gas ports 35 for permitting gas generated during the removal and attach process to vent away from the substrate. A vacuum source could be connected to the copper gas ports 35 to facilitate the removal of any gas generated during the process away from the substrate and prevent such gas from entering the atmosphere.

Gas ports 35 could also be used as a means of directing reducing or inert gas, such as nitrogen, to the solder reflow area. Such gases may be utilized to improve solderability and solder joint characteristics, that is, bright and shiny, by reducing and/or preventing metallic oxide formation at soldering temperatures.

The present invention also includes a device engaging portion 21. As stated above, the device engaging portion 21 may have a lower outer perimeter that is about the same size but typically slightly smaller than the perimeter of the electronic component being attached to a substrate. The shape of the perimeter of the device engaging portion may be about the same as the shape of the electronic component being attached to the substrate. The size and/or shape of the device engaging portion may vary depending, upon the shape and size of the device being attached to the substrate.

As shown in FIG. 3, the interior passage 27 may flare in the vicinity of the device engaging portion 21. This may permit the vacuum to act on a larger portion of the surface of the electronic device being attached to the substrate. The vacuum acting on a larger portion of the electronic device may help to ensure that the pick-up and vacuum head retains the electronic device. However, preferably, the thickness of the pick-up and vacuum head in the area of the device engaging portion 21 is sufficient to result in a desired amount of heat transferred to an electronic device in a desired period of time.

Figures 5, 6, 7:
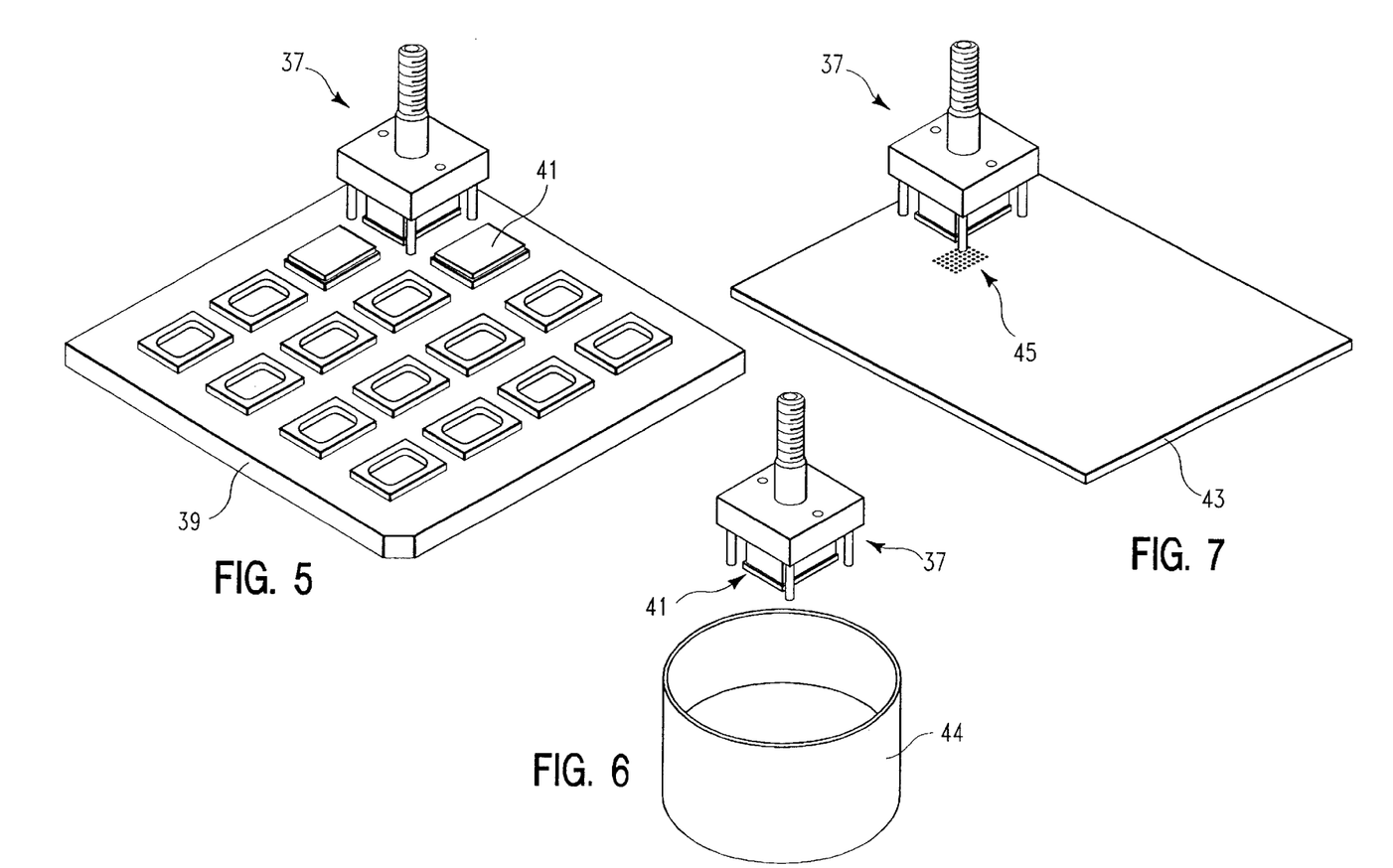

An apparatus according to the present invention may be incorporated into a system for attaching and removing electronic components to or from a substrate, such as a circuit board. FIGS. 5, 6 and illustrate various components of a system according to the present invention. The present invention is particularly useful with $\mu$BGAs particularly due to the low thermal mass of the devices being attached with $\mu$BGAs and the low thermal mass of the $\mu$BGAs.

A system according to the present invention may include a pick-up and vacuum head 37. The system may also include a component feed tray 39 on which electronic components 41 to be attached to a substrate 43 may be arranged. The component feed tray 39 may be arranged in a predetermined location so as to facilitate accurate alignment of the pick-up and vacuum head 37 with components 41 arranged on the tray.

Movement of the device pick-up and vacuum head may be controlled through computerized controls. The device pick-up and vacuum head may be attached to a robot control arm or other device for automatically moving and positioning it. Of course, the system also includes a vacuum source and a heat source.

Figure 9:
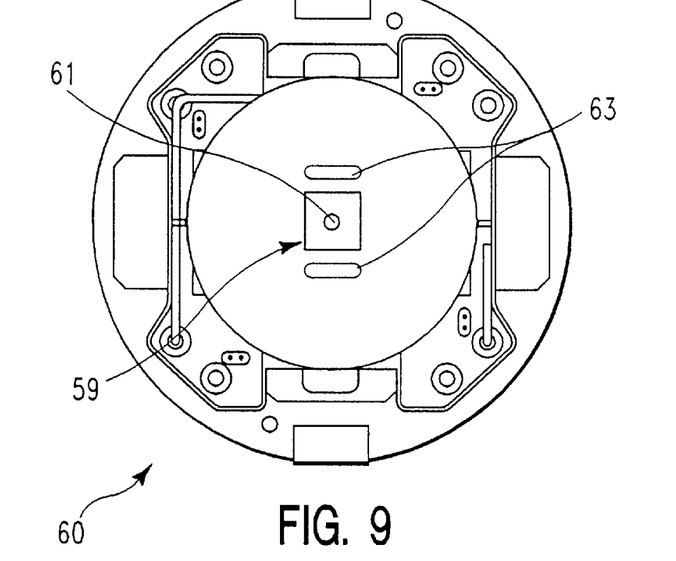
FIG. 9 represents an overhead view of an embodiment of an apparatus according to the present invention including heating and vacuum means as well as position altering means.
Figure 10:
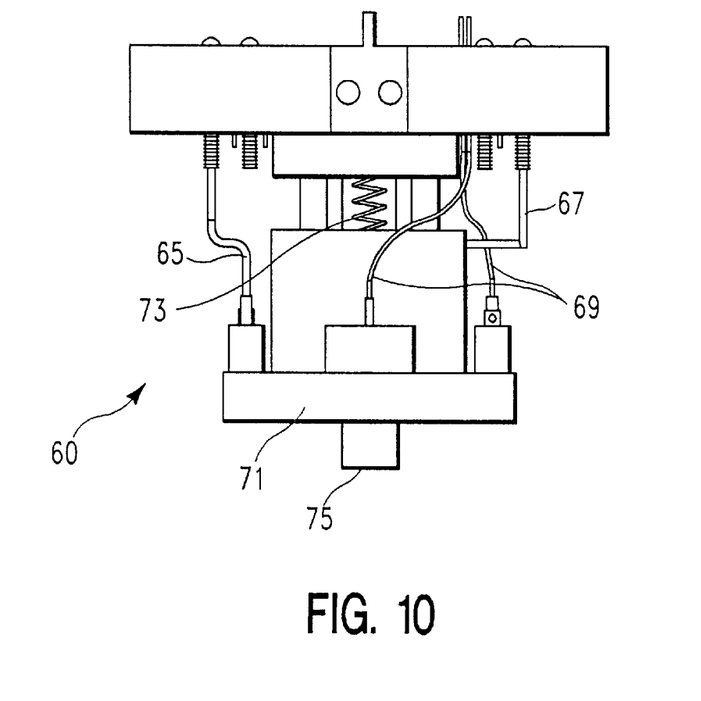
FIG. 10 represents a side view of the apparatus shown in FIG. 9.
Figure 11:
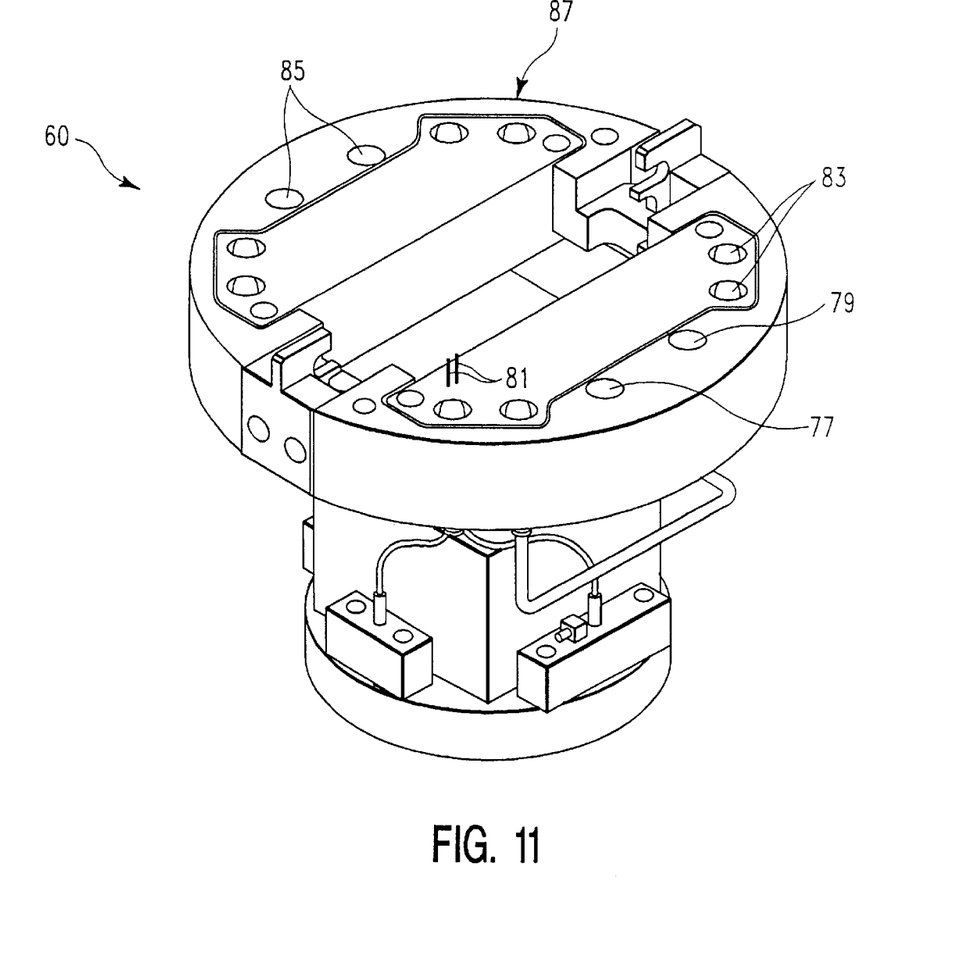
FIG. 11 represents a perspective view of the apparatus shown in FIGS. 9 and 10.

FIGS. 9–11 illustrate a bottom view, a side view, and a top perspective view of an embodiment of a device 59 according to the present invention attached to an apparatus 60 that include heating means, vacuum means, and position altering means. FIG. 9 illustrates the interior passage 61 through to which a vacuum is applied to pick up and retain the component. The apparatus illustrated in FIG. 9 includes two exhaust ports 63 through which nitrogen gas may exit to be directed toward the component as it is being heated and attached to a substrate, as described above.

As seen from the side in FIG. 10, the apparatus may include a source of positive voltage 65 to supply to create heat to be applied to the device 59. The apparatus may include a source of negative voltage 67 to complete the heating supply circuit.

To monitor the temperature of the heat source, the apparatus may include at least one thermocouple. Thermocouples may be connected to a controller and/or display through wires 69.

To control movement of the apparatus 60 and attached device 59, the system may include an x-y compliant gimbal 71 and a z-compliant spring 73.

The heated vacuum tip 75 of the device 59 is shown extending downwardly from the apparatus in FIG. 10.

FIG. 11 shows a perspective view of the top of the apparatus 60 shown in FIGS. 9 and 10. In FIG. 11 can be seen a vacuum exit 77, where a vacuum source could be connected. FIG. 11 also illustrates a port 79 where a nitrogen source may be connected. Thermocouple wires may exit the apparatus 60 at thermocouple outputs 81. The positive and negative voltages for generating the heat to be introduced into the component may be connected to a power source at connections 83. Movement of the apparatus 60, such as in the z-axis and gymbal locking, may be controlled by compressed air introduced at ports 85. FIG. 11 also illustrates an interface plate 87 where the apparatus 60 may interface with a robot for moving the apparatus and attached device 59 and picked up component.

A system according to the present invention may also include means for verifying alignment of a device to be attached to a substrate and the device pick-up and vacuum head. As shown in FIG. 6, the verification, or registration apparatus may include a machine vision tool 44 for visually determining the relative positions of the component 41 and the device pick-up and vacuum head 37. The machine vision tool could include a camera. In fact, several component positioning systems are known in the art. According to one embodiment, known as a "split optics" positioning system, the machine vision tool includes a prism and a camera in which the solder bump array of the component is superimposed over an image of the site on the substrate.

FIG. 6 shows a component acquired by an apparatus according to the present invention positioned over an upward-pointing camera. The machine vision tool locates the exact location of the component for high accuracy placement onto a desired site 45, identified in FIG. 7, on the substrate.

Figure 8:
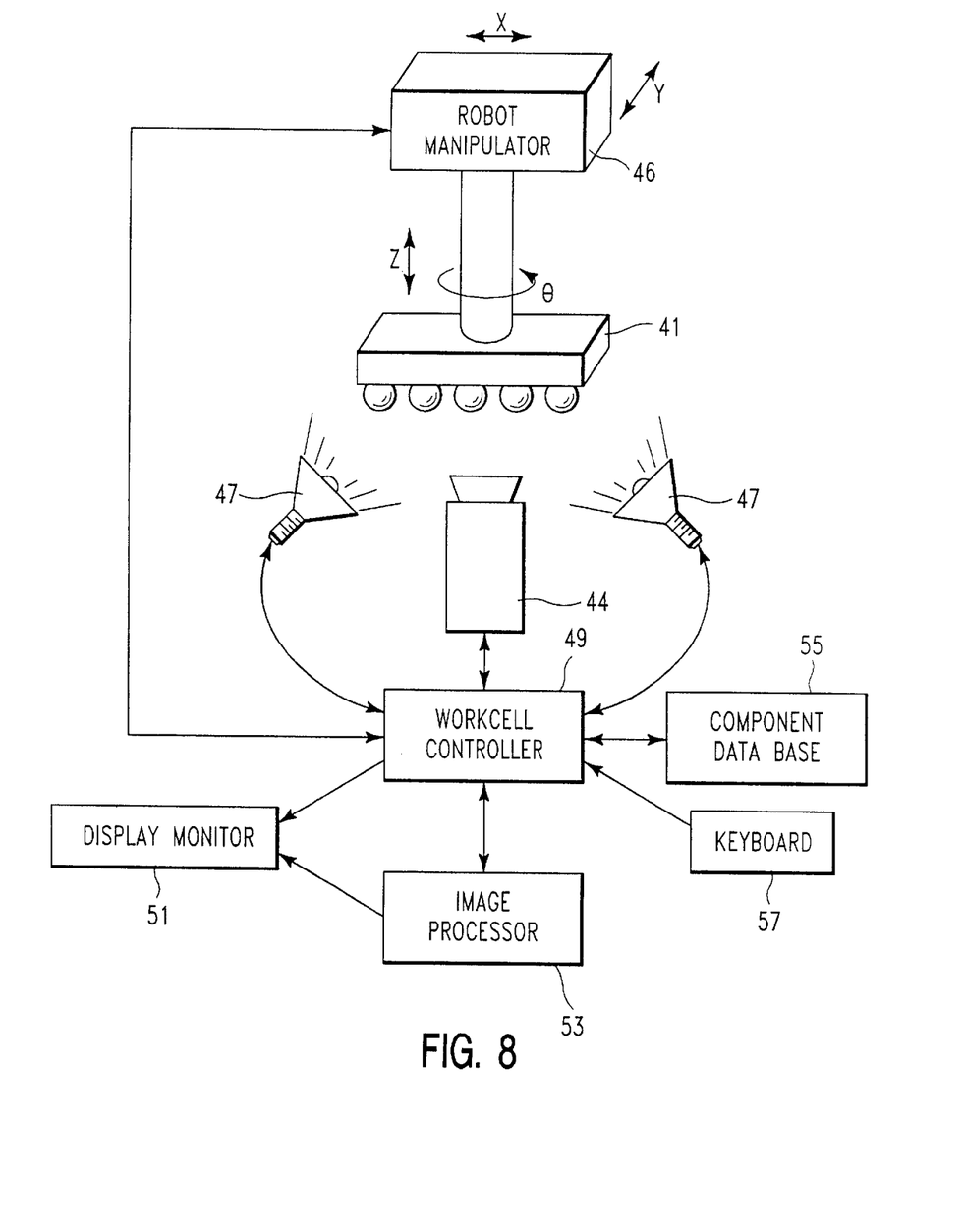
FIG. 8 represents an embodiment of a portion of a system according to the present invention, including elements for verifying alignment of an electronic component on an embodiment of a device according to the present invention.

FIG. 8 illustrates an isolated view of an embodiment of the present invention with a component to be attached to a substrate arranged over a vision system 44. As shown in FIG. 8, the apparatus according to the invention may be attached to a robot manipulator 46 for altering the position of the apparatus in the x, y, and z directions.

FIG. 8 also illustrates other elements that may be interconnected with the vision system 44 and the apparatus of the invention. For example, the system shown in FIG. 8 includes a pair of lights 47 for providing increased and more uniform illumination of the component 41. The robot manipulator 46, the vision system 44, and the lights may be interconnected with a workcell controller 49. The workcell controller 49 may help to coordinate and control movement of the component 41 and the sensing and position determination of the component.

Additionally, a system according to the present invention may include a display monitor 51 for displaying an image of the sensed component 41 as well as position and other data. The monitor 51 may be connected to the workcell controller 49. Furthermore, the system may include an image processor 53 for receiving the image of the component 41 and processing it. The image processor 53 may be connected to the monitor 51 as well as the workcell controller 49 for receiving image information and processing and/or transmitting the data to the monitor.

To facilitate recognition of the component and its arrangement the system and to help arrange the component on a substrate, the present invention may include a component database 55. The component data base may include sensed images of components that the present invention may be utilized with. The component data base 55 may be connected to the workcell controller 49 as illustrated in FIG. 8. After the component is sensed by the vision system 44, the data representing the component may be compared to representations in the component database.

To input and control the elements of the system, the system may include a keyboard 57. The keyboard 57 may be connected to the workcell controller 49.

A system according to the present invention may also include a support for supporting a circuit board or other substrate that the electronic component or device is to be attached to. Once the pick-up and vacuum head has engaged a device and, if necessary, alignment of the device and device pick-up and vacuum head has been verified, the device pick-up and vacuum head may be arranged over a desired site 45 on the substrate. The device pick-up and vacuum head may then be lowered onto the site 45. The heat is transmitted through the device pick-up and vacuum head into the device and into the solder balls of the BGA.

As soon as the device is removed from the feed tray 39, heating of the device pick-up and vacuum head and hence, the device, may begin.

According to one example, the solder balls of the μBGA are 63% tin, 37% lead. The composition of the solder balls may be important since the balls may not act as a standoff for the device. The standoffs discussed above may ensure that the balls are not compressed upon placement on the substrate.

The present invention also includes a method of attaching an electronic device to and/or removing an electronic device from a substrate. The method includes contacting the electronic device with a device for conductively applying heat to the electronic device and picking up the electronic device. Solder for attaching the electronic device to the substrate is heated to the reflow temperature of the solder by applying heat to the device for conductively applying heat.

The method may also include the providing an apparatus and/or a system as described above. Once the electronic device is arranged on the appropriate location a substrate and the electronic device and solder raised to an appropriate temperature, the vacuum may be interrupted and the pick-up and vacuum head disengaged from the electronic device.

According to the present invention, heat may be applied to the electronic device and hence, the μBGA sufficient to raise the temperature of the solder to its reflow temperature. According to typical embodiments, this temperature is from about 183° C. to about 350° C. The device pick-up and vacuum head, electronic device, and BGA may reach the solder reflow temperature in from about 5 seconds to about 30 seconds. The positioning of the electronic device on the substrate may be verified after connection to the substrate.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. An apparatus for attaching an electronic device to and removing an electronic device from a substrate, the device comprising:

an electronic device pick-up and vacuum head for applying a vacuum source to the electronic device for engaging, picking up and retaining the electronic device, wherein heat is transmitted by conduction through the structure of the device pick-up and vacuum head to the electronic device and solder for securing the electronic device on the substrate to heat the solder to its reflow temperature, the pick-up and vacuum head including an electronic device engaging portion, and a vacuum port;

a resistive heat source interconnected with the pick-up and vacuum head for applying heat to the pick-up and vacuum head and the electronic device; and at least one stand-off for controlling spacing between the electronic device and the substrate.

2. The apparatus according to claim 1, wherein the pick-up and vacuum head further comprises a heat source engaging portion, the resistive heat source comprises a resistive heating element interconnected with the heat source engaging portion of the pick-up and vacuum head.

3. The apparatus according to claim 2, wherein the vacuum port includes a tubular section extending from the electronic device engaging portion.

4. The apparatus according to claim 3, wherein the heat source engaging portion includes a threaded section on a surface of the vacuum port.

5. The apparatus according to claim 1, wherein the at least one stand-off is also for controlling spacing between electronic devices on the substrate.

6. The apparatus according to claim 1, including four stand-off posts arranged in a square attached to the electronic device engaging portion, the posts engaging a surface of the substrate that the electronic device is to be attached to.

7. The apparatus according to claim 1, wherein the substrate engaging portion includes a lower surface that engages the electronic device, the lower surface having a shape substantially similar to a shape of a perimeter of the electronic device.

8. The apparatus according to claim 1, further comprising:

at least one gas port for permitting gasses generated during removal and attaching of the electronic device to escape.

9. The apparatus according to claim 1, wherein the heat source is integral with the pick-up and vacuum head.

10. A system for attaching an electronic device to and removing an electronic device from a substrate, the system comprising:

an electronic device pick-up and vacuum head for applying a vacuum source to the electronic device for engaging, picking up and retaining the electronic device, wherein heat is transmitted by conduction through the structure of the device pick-up and vacuum head to the electronic device and solder for securing the electronic device on the substrate, the pick-up and vacuum head including an electronic device engaging portion and a vacuum port;

a vacuum source connected to the vacuum port;

a heat source connected to the device pick-up and vacuum head; and at least one stand-off for controlling spacing between the electronic device and the substrate.

11. The system according to claim 10, further comprising:

a camera for ensuring alignment of the electronic device on the device pick-up and vacuum head and alignment of the electronic device on the substrate.

12. The system according to claim 10, further comprising:

a component feed tray for aligning electronic devices with the device pick-up and vacuum head.

13. The system according to claim 10 wherein the heat source is a resistive heating element interconnected with the heat source engaging portion for applying heat to the vacuum head and the electronic device.

14. The system according to claim 13 wherein the vacuum port includes a tubular section extending from the electronic device engaging portion.

15. The system according to claim 14, wherein the device pick-up and vacuum head further comprises a heat source engaging portion that includes a threaded section on a surface of the vacuum port.

16. The system according to claim 10, further comprising:

at least one stand-off for controlling spacing between the electronic device and the substrate.

17. The system according to claim 10, wherein the at least one stand-off is also for controlling spacing between electronic devices on the substrate.

18. The system according to claim 10, including four stand-off posts arranged in a square attached to the electronic device engaging portion, the posts engaging a surface of the substrate that the electronic device is to be attached to.

19. The system according to claim 10, wherein the substrate engaging portion includes a lower surface that engages the electronic device, the lower surface having a shape substantially similar to a shape of a perimeter of the electronic device.

20. The system according to claim 10, further comprising:

at least one gas port for permitting gasses generated during removal and attaching of the electronic device to escape.

21. The system according to claim 10, wherein the heat source is integral with the pick-up and vacuum head.

* * * * *

UNITED STATES PATENT AND TRADEMARK OFFICE
CERTIFICATE OF CORRECTION

PATENT NO. : 6,196,439 B1
DATED : March 6, 2001
INVENTOR(S) : Allen T. Mays et al.

It is certified that error appears in the above-identified patent and that said Letters Patent is hereby corrected as shown below:

<u>Column 1</u>,
Line 66, "t he" should be -- the --.

<u>Column 5</u>,
Line 18, "time" should be -- times --.
Line 40, "that" should be -- than --.

Signed and Sealed this

Thirtieth Day of October, 2001

*Attest:*

*Attesting Officer*

NICHOLAS P. GODICI
*Acting Director of the United States Patent and Trademark Office*